US008583945B2

(12) United States Patent
Tran

(10) Patent No.: US 8,583,945 B2
(45) Date of Patent: Nov. 12, 2013

(54) MINIMIZING POWER CONSUMPTION IN COMPUTERS

(75) Inventor: Bao Tran, Saratoga, CA (US)

(73) Assignee: Muse Green Investments LLC, Dover, DE (US)

(*) Notice: Subject to any disclaimer, the term of this patent is extended or adjusted under 35 U.S.C. 154(b) by 522 days.

(21) Appl. No.: 12/813,734

(22) Filed: Jun. 11, 2010

(65) Prior Publication Data

US 2011/0173470 A1  Jul. 14, 2011

Related U.S. Application Data

(60) Provisional application No. 61/294,964, filed on Jan. 14, 2010.

(51) Int. Cl.
*G06F 1/00* (2006.01)

(52) U.S. Cl.
USPC .......................................... 713/300

(58) Field of Classification Search
USPC .......................................... 713/300
See application file for complete search history.

(56) References Cited

U.S. PATENT DOCUMENTS

| 7,958,508 | B2* | 6/2011 | Shimizu et al. | 718/102 |
| 8,112,644 | B2* | 2/2012 | Huang et al. | 713/320 |
| 2008/0320322 | A1* | 12/2008 | Green et al. | 713/340 |
| 2009/0070604 | A1* | 3/2009 | Kumakura | 713/310 |
| 2009/0199021 | A1* | 8/2009 | Chu et al. | 713/300 |
| 2009/0264154 | A1* | 10/2009 | Rofougaran | 455/557 |
| 2011/0161695 | A1* | 6/2011 | Okita et al. | 713/310 |

* cited by examiner

*Primary Examiner* — Mohammed Rehman
(74) *Attorney, Agent, or Firm* — Christensen O'Connor Johnson Kindness PLLC

(57) ABSTRACT

A computer is disclosed with an operating system including a kernel and a task scheduler to schedule execution of one or more processes on the computer; a power estimator is coupled to the task scheduler to determine a required system power based on the number or type of processes scheduled for execution; and a variable load power supply including a plurality of power generators each having a predetermined power output and a power manager receiving instructions from the power estimator in the kernel, the power manager enabling a sufficient number of power generators to match the required power generated by the power estimator.

17 Claims, 6 Drawing Sheets

MINIMIZING POWER CONSUMPTION IN COMPUTERS

This application claims priority to Provisional Patent Application Ser. No. 61/294,964, filed Jan. 14, 2010, the content of which is incorporated by reference.

The present disclosure relates generally to managing power consumption and work-load for a computer or groups of computers.

Modern computing operations have migrated from mainframes to servers. A few servers can be used to support operations for a small business, and large businesses can use numerous servers in their facilities. A large business or multiple businesses can host their servers in a data center. A data center is a facility used for housing a large amount of servers, storage devices, communications equipment, and other related equipment. The servers may be configured in a grid environment or clusters. A data center can occupy one or more buildings which have a well controlled environment. For example, typical data centers have strict requirements regarding air conditioning, power, back-up systems, fire prevention, and the like.

Typically, data centers are heavily over-provisioned in order to ensure they can meet their peak demand. However, the majority of the time, a server in a data center or grid environment is idle, yet consumes a large amount of power. Indeed, it is common that several servers are performing some tasks that could be performed by a single server at a fraction of the power consumption.

Until recently, little if any attention has been given to managing the power consumed in a data center and the heat generated by data center operations. In general, data center servers have only been concerned with performance, and ignored power consumption. Thus, conventional servers for data centers were designed and constructed to run at or near maximum power levels. In addition, as processor and memory speeds in servers have increased, servers are expected to require even more amounts of power. Larger memories and caches in servers also will lead to increased power consumption.

Unfortunately, the infrastructures supporting data centers have begun to reach their limit. For example, it has become increasingly difficult to satisfy the growth requirements of data centers. Recently, high technology companies in some regions were unable to get enough electrical power for their data centers and for the cooling equipment and facilities in which they were housed. In addition, the economic costs associated with operating data centers are becoming significant or prohibitive. Therefore, it is foreseeable that future data centers may need to find ways to reduce their power consumption and operational costs.

Solutions implemented by some server manufacturers have focused on power management of a single node or computer, such as by monitoring certain aspects of a single CPU's operation and making a decision that the CPU should be run faster to provide greater performance or more slowly to reduce power consumption. However, such solutions represent only a partial solution. Solutions fail to provide a systematic way for conserving power for a grid, an entire data center, or a system of data centers.

U.S. Patent Application No. 20070124684 discloses a global power management for a grid. A grid administrator is connected to the group nodes of the grid. During operation, the grid administrator calculates the cost of operations, such as electricity and cooling costs, and migrates the workload of the grid to minimize the cost of operations. In particular, the grid administrator may deactivate or power down one or more of the nodes in order to minimize the cost of operations.

For individual PCs, the same power management problem exists, albeit the cost is much less since only one PC is involved. However, to save environmental resources, if the power supply to personal computers can be made more efficient, users can enjoy the benefits of high performance computing without wasting energy. The PCs use power supplies to provide power to various electronic components employed in various machines, control processes, etc. The amount of load required by a particular power supply is often specified as its maximum load. These maximum current requirements can be listed as part of the power supply's output specifications. The amount of load required can vary considerably between different form factors, between manufacturers, and between specific designs from the same manufacturer. In general, when a power supply's output is discussed, a particular number of watts are specified. An output rating refers to the nominal, total maximum output power of all the voltages that the power supply provides. With relation to DC electricity, the computation of power is determined by multiplying its current in Amps, and its voltage in Volts. Typically, however, power supplies produce several different voltages, rendering such a basic computation insufficient. Output specifications for a power supply, generally include all the different voltages that the power supply provides, and the amount of current it can supply for each. This is sometimes called the power distribution for the supply. Each voltage produced by a power supply can be employed for a different purpose, which is why individual current ratings should be checked for each voltage, and not just use the total wattage of the supply. The goal behind analyzing the power supply's output rating and power distribution is to match it to the needs of your system to ensure it will provide the power needed. The key problem is to determine exactly how much power a given system uses. For instance, with regard to peripheral components, the current (or power) rating of a device such as a hard disk, refers to the manufacturer's claim of how much the device uses during normal, continuous operation. The actual peak draw of the device is at its maximum, however, at startup—not while it is running. The +12 voltage provided by the power supply is used primarily to drive disk drive motors. Because of their design, these motors can take up to double their steady-state current when they are spinning up from rest. For example, if three or four hard disks are employed in a system and all of them start up at the same time, this can be a tremendous demand on your power supply's ability to provide +12V power. At any given point in time, each voltage line may have dynamic power requirements. In order to accommodate such fluid power requirements, a power supply would have to be designed to accommodate power that far exceeded normal usage levels.

U.S. Patent Application No. 20070096562 discloses a power supply with an input component that receives power from a source and an automatic load sense (ALS) component associated with the power supply that monitors and regulates at least two or more of current and power output from the power supply. The power supply provides power from the ALS component to one or more variable load components.

SUMMARY

In one aspect, a power supply includes a plurality of power generators, each providing an output of a predetermined power; and a power manager coupled to the power generators, the power manager receiving a request for a predetermined amount of power from an operating system kernel, the power manager enabling a sufficient number of power generators to satisfy the request for power from the operating system kernel.

In another aspect, a computer includes an operating system including a kernel and a task scheduler to schedule execution of one or more processes on the computer; a power estimator coupled to the task scheduler to determine a required system power based on a number or type of processes scheduled for execution; and a variable load power supply including a plurality of power generators each having a predetermined power output and a power manager receiving instructions from the power estimator in the kernel, the power manager enabling a sufficient number of power generators to match the required power generated by the power estimator.

In yet another aspect, a system includes a plurality of computers forming a computer grid or a computing cloud, each computer having an operating system including a kernel and a task scheduler to schedule execution of one or more processes on the computer; a power estimator coupled to the task scheduler to determine a required system power based on a number or type of processes scheduled for execution; and a variable load power supply including a plurality of power generators each having a predetermined power output and a power manager receiving instructions from the power estimator in the kernel, the power manager enabling a sufficient number of power generators to match the required power generated by the power estimator; and a global power manager coupled to the plurality of computers, wherein the global power manager moves one or more tasks from a first computer to a second computer and reduces the predetermined amount of power required by the first computer.

Advantages of the above systems and methods may include one or more of the following. The systems and methods flexibly determine and provide appropriate current and power required by particular components within a system. The system can be used to conserve power for stand alone PCs as well as PCs in an intranet or PCs that form a grid or cluster and conserve power. The system can globally manage a cloud or a grid while reducing the power consumption and operational costs of that cloud or grid. This in turn allows data centers to require less air conditioning and to be environmentally responsible. Moreover, the system allows more computers to be packed into the same footprint, thus increasing the computing power of the data center as a whole.

Additional features of the present disclosure will be set forth in part in the description which follows, and in part will be obvious from the description, or may be learned by practice of the disclosure. It is to be understood that both the foregoing general description and the following detailed description are representative and explanatory only and are not restrictive of the disclosure.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DESCRIPTION

Embodiments of the present disclosure provide methods and systems for locally as well as globally managing the power consumption of a group of local computers as well as computers in a data center or grid environment. For purposes of explanation, the following disclosure describes embodiments being applied to a grid environment. However, embodiments of the present disclosure can be applied to other configurations that may be used in a data center, such as a server cluster. It may also be appreciated that although the representative embodiments focus attention toward servers, server systems, and power saving features for a grid environment, any type of distributed computer system may benefit from the principles of the present disclosure.

Figure 1A:
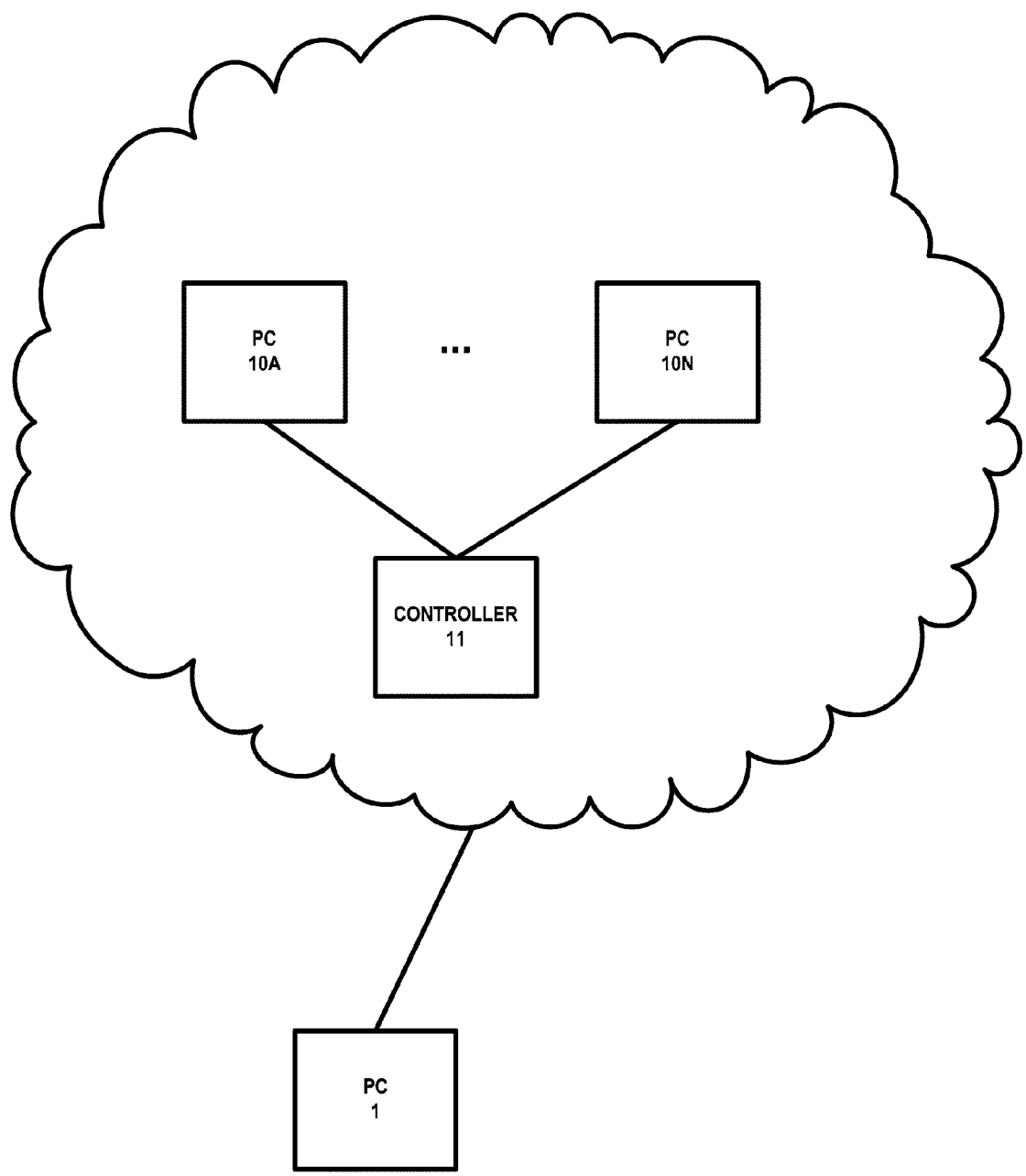
FIG. 1A is block diagram illustrating a grid computing system used in accordance with one or more embodiments of the present disclosure.
Figure 1B:
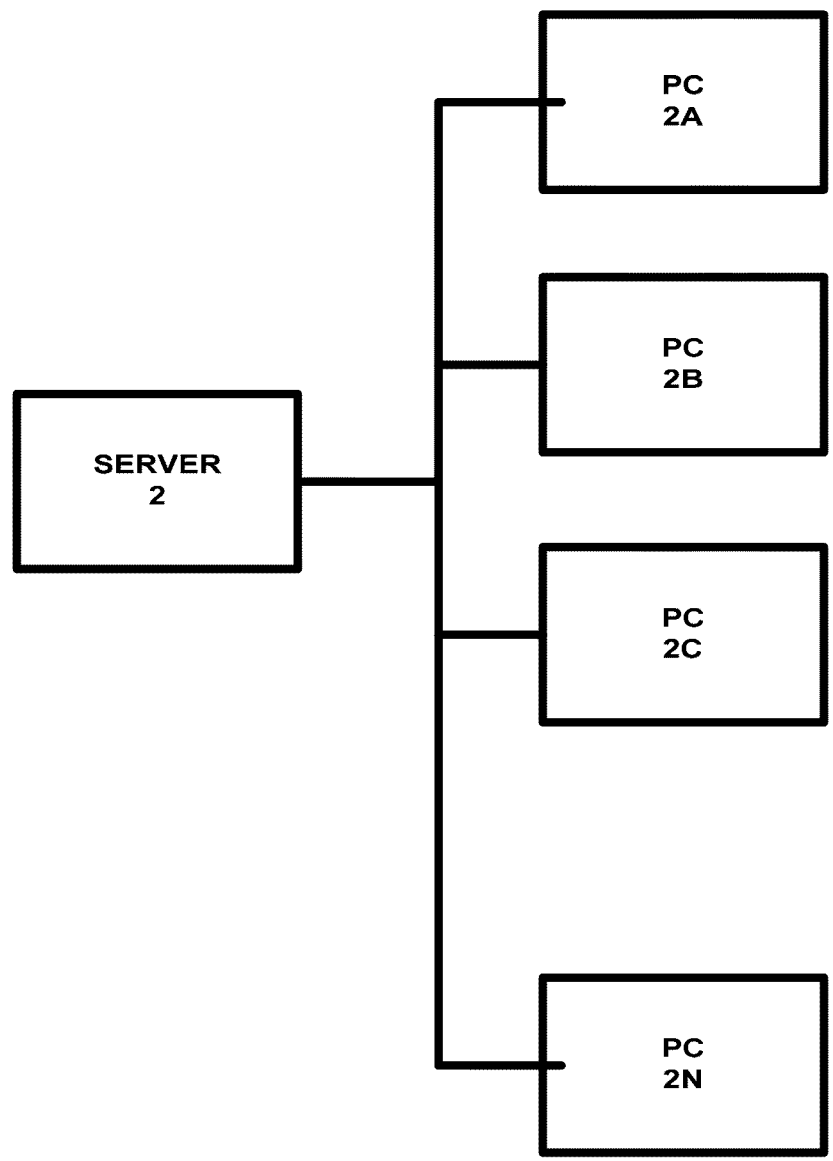
FIG. 1B is a block diagram illustrating another embodiment of a grid computing system used in accordance with one or more embodiments of the present disclosure.

Referring now to FIG. 1A, a low-power cloud based computing system or a grid computing system is disclosed. In this system, a computer PC 1 communicates over a network to a plurality of computers PC10A ... PC10N. Each of computers PC10A-PC10N can be a cluster of servers or a multi-processor system that provides computing services over the cloud (cloud computing). Power consumption of computers PC10A ... PC10N is monitored and controlled by a controller 11. In another embodiment, the controller 11 can also monitor and control workload management of the computers PC10A-PC10N. The computers in the cloud are typically operated in a data center and are known as cloud computing. FIG. 1B shows another embodiment where a server 2 communicates with a plurality of PCs 2A ... 2N over a network. The communication can occur over a local area network (LAN), intranet or wide area network (WAN).

Figure 2:
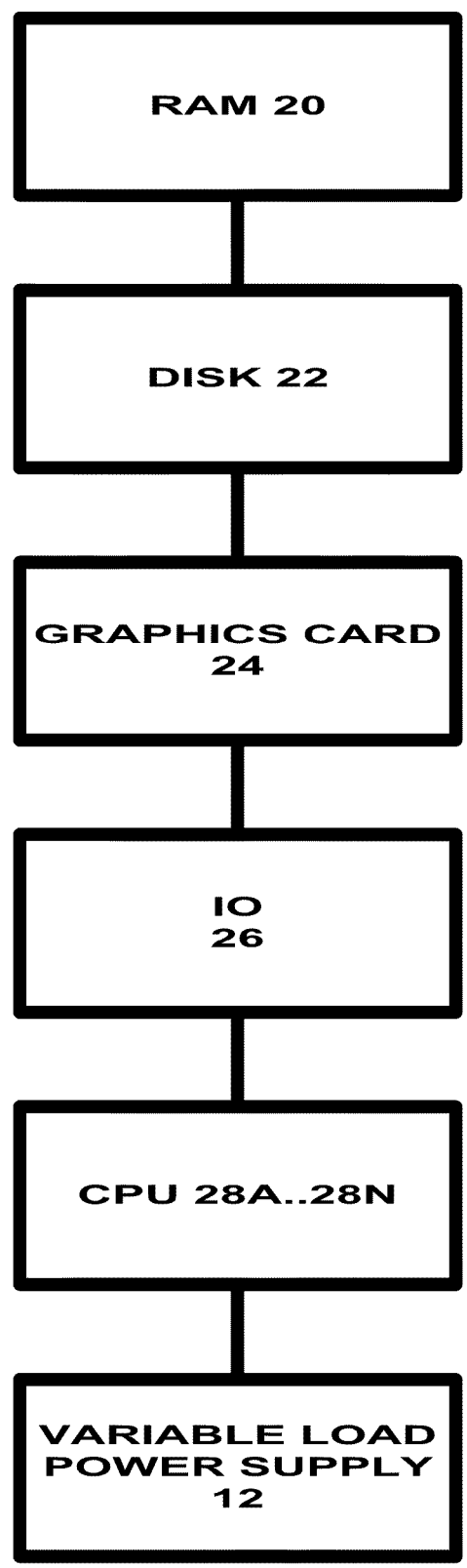
FIG. 2 is a block diagram illustrating an example computing system including a variable power management module in accordance with one or more embodiments of the present disclosure.

FIG. 2 shows a representative computing system with variable power management. The system of FIG. 2 includes memory 20, data storage devices 22, graphics card 24, input/output devices 26, and one or more processors 28A ... 28N. These devices are powered by a variable load power supply 12. The variable load power supply 12 can increase its wattage on the fly as instructed by a power management unit (not shown). A plurality of power transistors are used in the variable load power supply 12 and can be gated to increase or decrease the total wattage provided by the power supply 12.

One implementation of the computing system of FIG. 2 performs kernel-based power management and/or workload management. The illustrative computing system includes multiple processing resources. The computing system has a user space for executing user applications and a kernel configured to manage the resources and communicate between the resources and the user applications. A process scheduler executes from the kernel and schedules processes for operation on the resources. A power manager is initiated by the process scheduler and operates to allocate resources and manage power to be delivered for one or more workload. Accordingly, power management determinations are made in the process scheduler which is internal to the kernel. Power management is moved into the kernel process scheduler, and the process scheduler is responsible for determining which processes next attain access to the processor and power to be delivered. In various embodiments, the resources can include processors, physical or virtual partitions, processors allocated to multiple physical or virtual partitions, virtual machines, processors allocated to multiple virtual machines, or the like. In some implementations, the resources can also include memory resources, storage bandwidth resources, and others. The kernel scheduler attempts to allocate the resources to the workloads on the operating system partition. If insufficient resources are available, a request for more can be made to a higher level workload manager which allocates processors between partitions. When a processor is added, the kernel based workload manager-enabled process scheduler allocates the resources and the power for the newly acquired processors. The power management arbitrator queries system components to determine consumption of resources by the workloads, and adjusts allocation of resources and power level according to consumption. Power management is performed by accessing the system of FIG. 2 to determine which resources are consumed by various processes and then adjusting entitlement or allocation of the processes to the resources as well as power allocation. For example, if four instances of a program are running, the power management unit determines how much resource and power is allocated to support each of the instances and adjustments are made, if appropriate.

Figure 3:
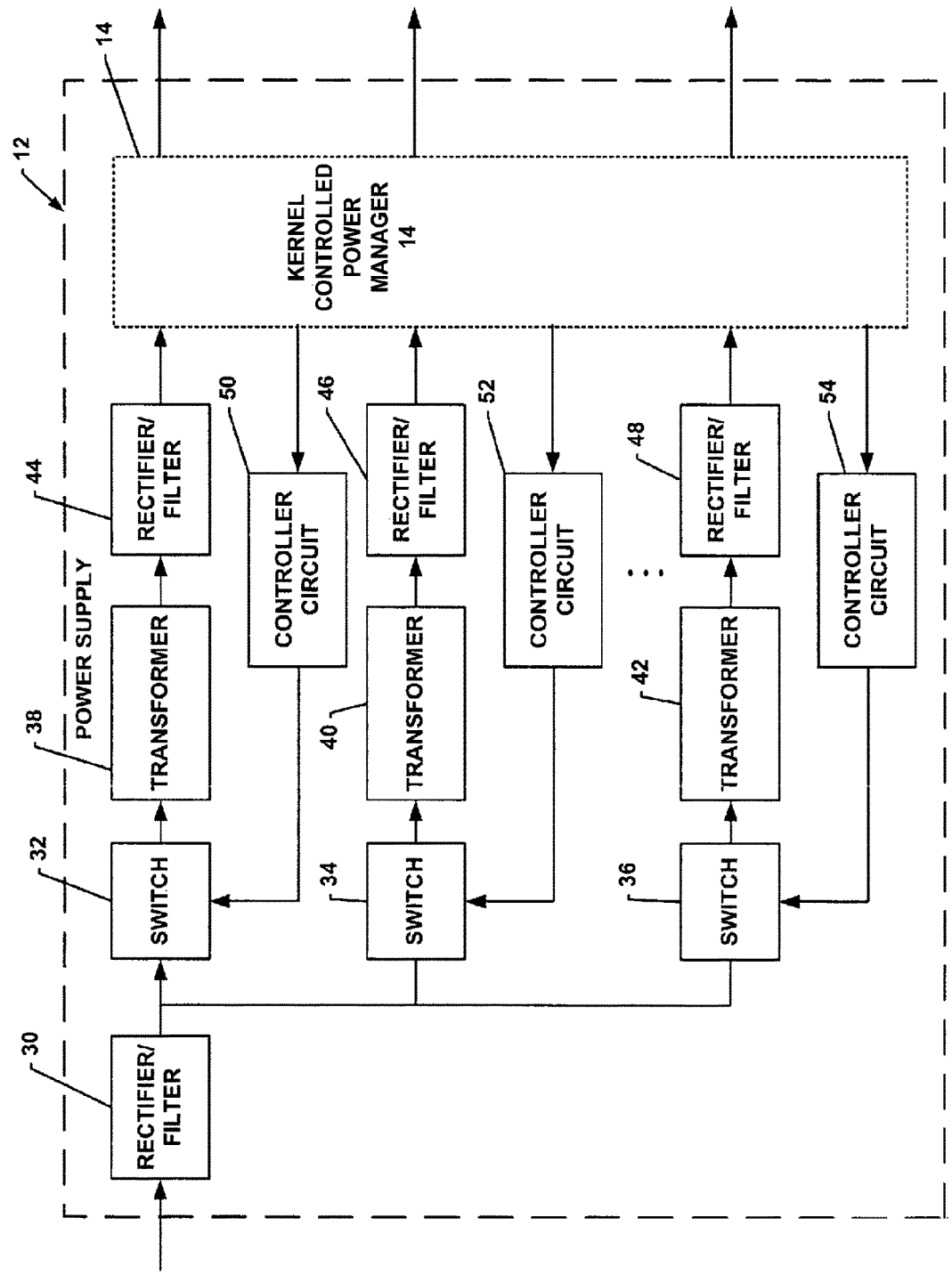
FIG. 3 is a block diagram illustrating one example of a variable load power supply having a plurality of voltage and coupled to a kernel controlled power manager in accordance with one or more embodiments of the present disclosure.

FIG. 3 shows a representative variable load power supply 12 which provides a plurality of voltage outputs to one or more components (not shown). It is to be appreciated that although three outputs are shown, up to N voltage outputs can be provided from the power supply 12 where N is an integer greater than or equal to one. Additionally, a plurality of outputs can be at the same voltage when needed to power the PC. For example, since 5V is commonly used, the power supply can provide a plurality of 5V outputs. Less commonly used voltages such as 12V would require only one output. A rectifier/filter 30 receives power from an external source and transmits this power to switches 32, 34, and 36. The switches 32, 34, and 36 in turn transmit their respective signals to transformers 38, 40, and 42. Rectifier/filters 44, 46, and 48 provide rectified DC power to the power manager 14 for further processing. Power is output to one or more external components (not shown) via the power manager 14. In one example, the power supply 12 receives an AC input wherein the rectifier 30 converts this input to a direct current (DC) signal. The rectifier can produce an unregulated DC voltage which is then smoothed by a filter element, such as a capacitor, for example. The current drawn from the input by the rectifier 30 can occur in short pulses around the AC voltage peaks. These pulses have significant high frequency energy which can reduce the power factor associated with the AC input. It is to be appreciated that rectification of the signal is not required if the power supply receives a DC input. In another example, utilizing an input range switch (not shown), the rectifier 30 can be configured to operate as a voltage doubler when operating on a low voltage (e.g., 120 VAC, etc.) range and as a straight rectifier when operating on a high voltage (e.g., 240 VAC, etc.) range. If an input range switch is not utilized, then a full-wave rectifier can be employed and an inverter stage (e.g., switches 32, 34, and 36) can be employed to accept a wide range of DC voltages produced by the rectifier 30. If the power supply 12 is associated with higher power levels, some form of automatic range switching can be employed. The switches 32, 34, and 36 convert the DC signal, whether directly from the input or from the rectifier stage described above, to AC by switching it on and off ("chopping") at a frequency of tens or hundreds of kilohertz (kHz). In one example, the frequency is switched to a frequency greater than 20 kHz to make it inaudible to humans. In one approach, the switching can be done by MOSFET transistors, which have a low on-resistance and a high current-handling capacity. The switches 32, 34, and 36 can be controlled to produce variable "on" time, which feeds the transformers 38, 40, and 42 with the switched energy. By controlling the "on" time of the switch, the output of the transformer can be regulated. The output of the transformer is rectified and filtered via the rectifier/filters 44, 46, and 48. The noise that is filtered can be comprised of both line ripple and higher frequency switching noise. This switching noise can be generated from the switch noise itself and, to a lesser extent, the reverse recovery from the rectifier/filters 44, 46, and 48. In one example, the inverted AC can be utilized to drive the primary winding of the high-frequency transformers 38, 40, and 42 to isolate the output from the input. This converts the voltage up or down to a required output level on the secondary winding of the transformers 38, 40, and 42. If a DC output is required, the AC output from the transformer can be rectified and smoothed by a filter consisting of inductors and capacitors.

Non-isolated power supplies can be employed if power isolation is not required, wherein an inductor is employed instead of the transformers 38, 40, and 42. This can include boost converters, buck converters, and a buck-boost converter. These belong to the simplest class of single input, single output converters which utilize one inductor and one active switch (e.g., MOSFET, etc.). The buck converter reduces the input voltage, in direct proportion, to the ratio of active switch "on" time to total switching period, called the duty ratio. For example, an ideal buck converter with a 10V input operating at a duty ratio of fifty percent will produce an average output voltage of 5V. A feedback control loop is usually employed to maintain (regulate) the output voltage by varying the duty ratio to compensate for variations in input voltage. The output voltage of a boost converter is always greater than the input voltage. The buck-boost output voltage is inverted but can be greater than, equal to, or less than the magnitude of its input voltage. It is to be appreciated that there are many variations and extensions to this class of converters but these three form the bases of almost all isolated and non-isolated DC to DC converters. By adding a second inductor, alternative converters (e.g., Cuk, SEPIC, etc.) can be implemented by adding additional active switches to provide various bridge converters. In another embodiment, the power supply 12 can employ a capacitor-diode voltage multiplier instead of inductors and/or transformers. Such implementations are typically utilized for generating high voltages at low currents.

The controller circuits 50, 52, and 54 can monitor the output voltage sent to the kernel controlled power manager 14 and compare it to a reference voltage. Such reference voltage can be set manually or electronically to the desired output. If there is an error in the output voltage (e.g., the voltage level is too high, etc.), the controller circuits 50, 52, and 54 can compensate by adjusting the timing with which the switches 32, 34, and 36 are switched on and off. Thus, the controller circuits can be referred to as switching regulators. Depending on particular design/safety requirements, the controller may or may not contain an isolation mechanism (e.g., opto-couplers, etc.) to isolate it from the DC input. In an alternative embodiment, an open loop regulator can be employed, which does not employ a feedback circuit. Instead, open loop regulators rely on feeding a constant voltage to the input of the transformer or inductor, and assume that the output will be correct.

The kernel controlled power manager 14 receives power from the rectifier/filters 44, 46, and 48. As noted, each of the rectifier/filters 44, 46, and 48 can provide substantially any voltage level. The kernel controlled power manager 14 monitors the amount of current required to drive the one or more external components (not shown) connected to the power supply 12. If the kernel controlled power manager 14 determines that the amount of current and/or power required by one or more external components (not shown) exceeds a predetermined threshold, the kernel controlled power manager 14 can idle one or more output lines in order to prevent overloading of the power supply 12. Additionally, when the processing load is low, the power manager 14 can idle one or more output lines to reduce system power consumption. Thus, if the computer of FIG. 2 runs out of work, the power manager 14 can shut down one or more sub-regulators to conserve power. When the workload increases, as sensed by the kernel, the computer can turn on more sub-regulators to provide the increased power or wattage to enable the processors to run the system at full speed to provide high performance on demand.

The variable load power supply 12 is controlled by a power manager unit or module run by one of the processors 28A . . . 28N of FIG. 2. The power manager unit can be controlled locally by the computer of FIG. 2, or can be controlled globally by the power controller 11 of FIG. 1A for server farms, among others.

In one embodiment, the power management unit works in an operating system kernel in cooperation with process scheduling. The power management process cooperates with a process scheduler in the kernel, thereby enabling near-instantaneous adjustment of power requirements. Arbitration of processor or central processing unit (CPU) resource allocation between workloads is moved into a process scheduler in the kernel, effectively adding more functionality to the kernel-based process scheduler. The added modules use workload management information in addition to the existing run queue and process priority information for determining which processes to run next on each CPU and to selectively turn on additional power supplies to meet the power requirement. The kernel runs inside the operating system, so that workload management functionality in the kernel applies to multiple workloads in a single operating system image using resource partitioning. In an illustrative system, process scheduler-based workload management calls out to a global arbiter to do the movement of resources between separate operating system-type partitions.

In a grid environment, a plurality of processing nodes are coupled together in order to service various workloads. Each node may be implemented as a server. The server may include at least one processor or may include multiple processors. The processing nodes may be coupled together in a variety of ways. For example, the nodes may be coupled together over a network, such as the Internet, or a local area network. In some embodiments, the grid is monitored to determine its current and expected workload. Various configurations of the grid are then determined and compared against the current and expected workload to determine if they meet the workload of the grid. A cost of operation is calculated for each configuration. The cost of operation may factor in various factors, such as electrical costs, cooling costs, labor costs, etc. One of the configurations is then selected and implemented in the grid based on the total cost of operation. In some embodiments, the grid is controlled to minimize the cost of operations by concentrating the workload in various nodes of the grid and deactivating those nodes that are considered unnecessary.

Figure 4:
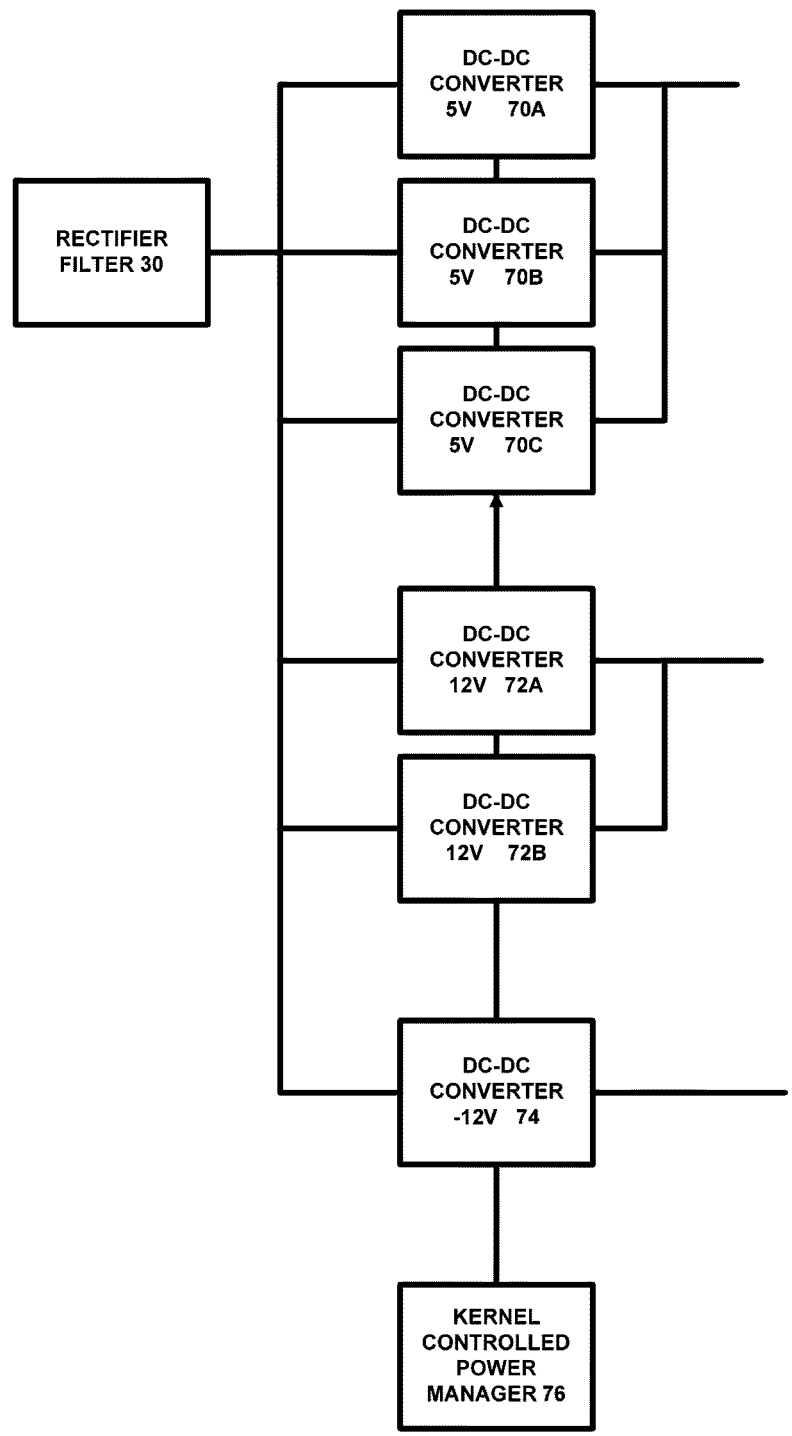
FIG. 4 is a block diagram illustrating another example of a variable load power supply having a plurality of converters gated together and coupled to a kernel controlled power manager in accordance with one or more embodiments of the present disclosure.

FIG. 4 shows another embodiment of a variable load power supply. In this embodiment, AC voltage is provided to a rectifier/filter 30 that converts the AC into rectified DC voltage. Then a plurality of DC-DC converters 70A-70C are gated together and selectively turned on to provide the required amount of power as dictated by the kernel of the OS. In the system of FIG. 4, three voltages are supplied: 5V, 12V, and −12V. Since 5V is most commonly used, the plurality of converters 70A-70C are provided and can be selectively enabled by a kernel controlled power manager 76 to supply as much power as requested by the operating system. For 12V supply, DC-DC converters 72A, 72B are controlled by the power manager 76 to deliver the required amount of 12V power. Additionally, one −12V DC-DC converter 74 can be turned on/off by the power manager 76 if specific I/O devices require such a voltage.

Figure 5:
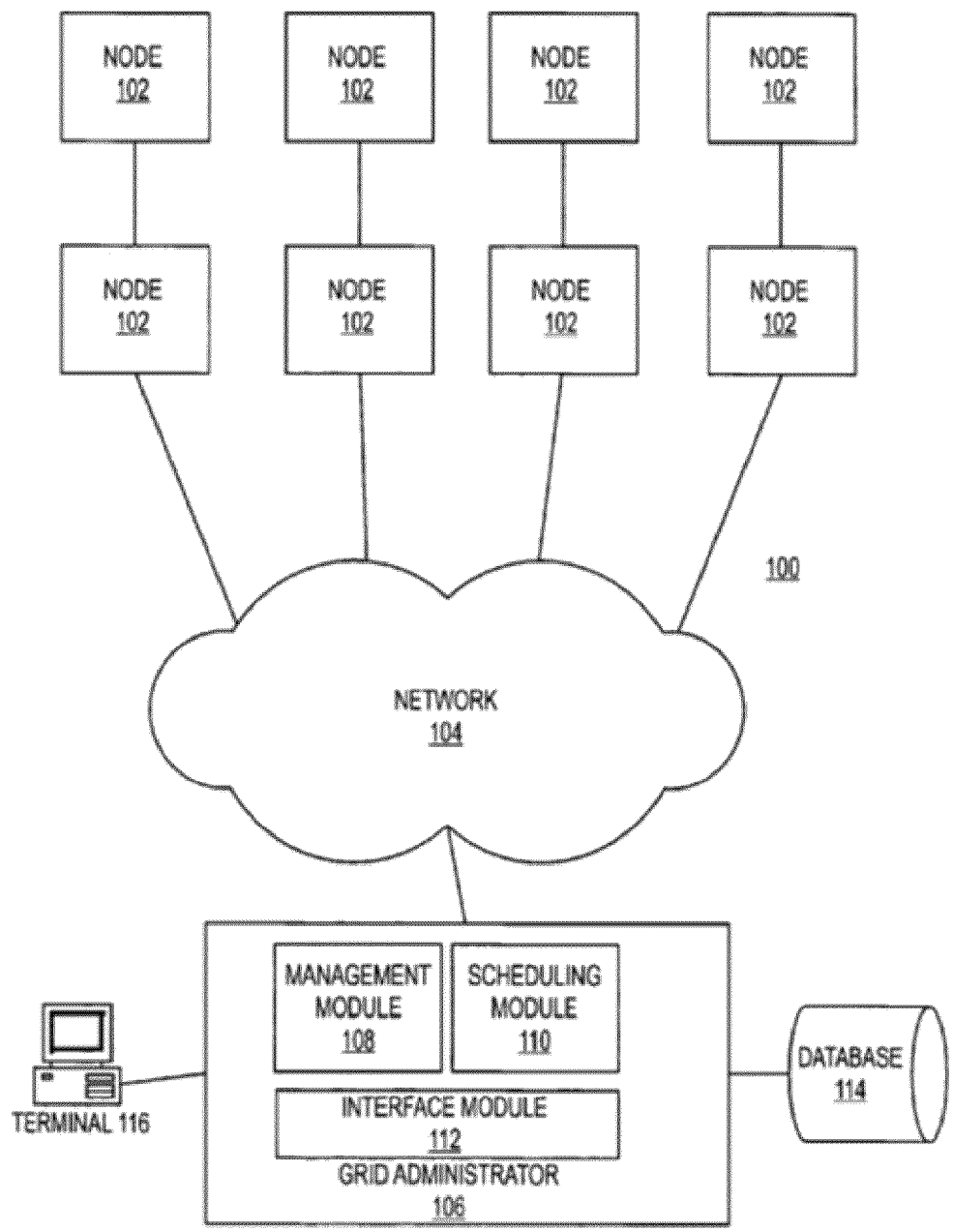
FIG. 5 is block diagram illustrating an example of a grid system having a plurality of nodes coupled together by a network in accordance with one or more embodiments of the present disclosure.

FIG. 5 shows a representative grid system 100 in accordance with another embodiment. As shown, grid system 100 may comprise a plurality of nodes 102 that are coupled together by a network 104. These components may be implemented using the kernel controlled power supply such as those of FIG. 2. Network 104 provides a communication infrastructure for coupling together nodes 102. Network 104 may be implemented using any form of network, such as a local area network, wide area network, and the like. For example, network 104 may comprise the Internet, an Ethernet network, or a switching fabric. In addition, network 104 may comprise other elements (not shown), such as routers, switches, hubs, firewalls, and the like. Nodes 102 may be located in a single facility or data center or distributed across multiple locations.

A grid computing service system such as Amazon.com's Elastic Compute Cloud (EC2) web computing system can be used. The grid computing system is a web service that provides resizable computing capacity in the cloud. It is designed to make web-scale computing easier for developers. The grid computing system differs fundamentally in the flexibility, control, and significant cost savings it offers developers, allowing them to treat the grid computing system as their own personal data center with the benefit of a robust infrastructure. When computing requirements unexpectedly change (up or down), the grid computing system can instantly respond, meaning that developers have the ability to control how many resources are in use at any given point in time. In contrast, traditional hosting services generally provide a fixed number of resources for a fixed amount of time, meaning that users have a limited ability to easily respond when their usage is rapidly changing, unpredictable, or is known to experience large peaks at various intervals. With the grid computing system, developers enjoy the benefit of paying only for their actual resource consumption—and at very low rates. Most hosting services require users to pay a fixed, up-front fee irrespective of their actual computing power used, and so users risk overbuying resources to compensate for the inability to quickly scale up resources within a short time frame.

In one embodiment, one or more applications consume computing power by making requests through the Internet. Data can be stored in a cloud storage from one or more processor slices. A work load sensor provides utilization feedback in the form of queue length or delay time. If the queue length exceeds a predetermined size, or the delay time exceeds a threshold, then additional slices can be added or removed as appropriate. The grid computing system enables "compute" in the cloud. The grid computing system's simple web service interface allows a developer to obtain and configure capacity with minimal friction. The grid computing system reduces the time required to obtain and boot new server instances to minutes, allowing a developer to quickly scale capacity, both up and down, as the computing requirements change. The grid computing system changes the economics of computing by allowing the developer to pay only for capacity actually used. The "Elastic" nature of the service allows developers to instantly scale to meet spikes in traffic or demand. When computing requirements unexpectedly change (up or down), the grid computing system can instantly respond, meaning that developers have the ability to control how many resources are in use at any given point in time. In contrast, traditional hosting services generally provide a fixed number of resources for a fixed amount of time, meaning that users have a limited ability to easily respond when their usage is rapidly changing, unpredictable, or is known to experience large peaks at various intervals. The grid computing system enables the developer to increase or decrease capacity within minutes, not hours or days. The developer can commission one, hundreds or even thousands of server instances simultaneously. When more instances are needed, the system invokes EC2's RunInstances, and the grid computing system will typically set up new instances in a matter of minutes. Of course, because this is all controlled with web service APIs, an application can automatically scale itself up and down depending on its needs.

Grid administrator 106 manages the operations of nodes 102. As shown, grid administrator 106 may be implemented as a central server or computer in grid system 100. Of course, grid administrator 106 may also be implemented in a distributed manner over several machines.

In general, grid administrator 106 is configured to monitor and evaluate the current status of nodes 102, schedule workloads (or portions of workloads) to nodes 102, collect workload results from nodes 102, and package the results from nodes 102 for delivery to the workload requester. Grid administrator 106 may also contain all of the relevant information with respect to the grid's topology, processor capacity for each of the nodes 102, available memory for each of the nodes 102, I/O controller assignments for each node 102, and the like.

In order to perform the above mentioned functions, grid administrator 106 may comprise a management module 108, a scheduling module 110, and an interface module 112. In addition, grid administrator 106 may be coupled to a database 114. These components will now be further explained.

Management module 108 is responsible for controlling and setting up nodes 102 to service the workloads requested. For example, management module 108 is responsible for assigning I/O controllers to nodes 102, and monitoring the operation of all the other equipment (not shown) in system 100, such as storage devices, cooling equipment, and the like.

In addition, management module 108 provides a mechanism for migrating workloads across nodes 102. This may be done by stopping the workload on one node and starting it on the other node, or by live process migration. For example, if the demand for computing resources exceeds what is currently available on a node, then management module 108 may migrate the workload to another node or share the workload with multiple nodes 102. Management module 108 may migrate workloads based on network bandwidth available to a node, where workloads are being requested (such as the locations of website users), where workloads will have the best service levels or service level agreements, or where nodes 102 have the most administrative capacity. Other known ways of migrating workloads may also be implemented by management module 108.

In some embodiments, if management module 108 detects excess capacity or that workloads can be consolidated, then management module 108 may concentrate the workloads onto a set of nodes 102 (called "active" nodes) and power down nodes that are unnecessary ("inactive" nodes). Of course, management module 108 may utilize a buffer or "headroom" in order to avoid repetitive cycling of nodes 102. When the workload demand of grid system 100 exceeds the capacity of active nodes, then management module 108 may reactivate a number of inactive nodes.

Management module 108 may also employ anticipatory reactivation based on various factors. For example, management module 108 may consider the time needed to power and start up a particular node. Management module 108 may also refer to recent workload trend information and extrapolate an expected workload for the near future, such as workload expected within the next hour. Management module 108 may also consider trend information, such as seasonal or daily histories of workload activity to determine the number of active versus inactive nodes. For example, the history of grid system 100 may be that utilization of nodes 102 rises from 30% to 50% at 9:00 AM on weekdays. Accordingly, management module 108 may use anticipatory reactivation at 8:55 AM in preparation for the expected increase in demand.

Management module 108 may also use anticipatory deactivation. For example, the history of grid system 100 may be that utilization of nodes 102 typically drops at 5:00 PM. In response, management module 108 may determine that fewer nodes 102 are needed and deactivate some of nodes 102. Management module 108 may also use this information as a basis for using a smaller buffer or headroom of excess capacity. For example, if workload increases at 4:55 PM, then management module 108 may elect not to reactivate any of nodes 102, since workload is generally expected to decrease around 5:00 PM. Of course, management module 108 may also use recent trend information to extrapolate an expected workload demand for the near future when deciding whether to deactivate one or more of nodes 102.

As noted, management module 108 is responsible for the global or general power management of grid system 100. In particular, management module 108 may be capable of powering any of nodes 102 off, powering any of nodes 102 on, or powering any of nodes 102 to intermediate states that are neither completely on nor completely off, that is, "sleep" or "hibernate" states. Management module 108 may determine the configuration of nodes 102 based on economic costs in order to reduce the total cost of operations of grid system 100. For example, management module 108 may determine which of nodes 102 are powered off or on based on electrical costs, cooling costs, labor costs, etc. Management module 108 may also consider other costs, such as service costs, equipment purchasing costs, and costs for space for nodes 102. Accordingly, management module 108 may automatically shift workloads to nodes 102 where electricity costs are cheaper for that time of day.

Scheduling module 110 operates in conjunction with management module 108 to schedule various portions of workloads to nodes 102. Scheduling module 110 may use various algorithms to schedule workloads to nodes 102. For example, scheduling module 110 may use algorithms, such as weighted round robin, locality aware distribution, or power aware request distribution. These algorithms are well known to those skilled in the art and they may be used alone or in combination by scheduling module 110. Of course, scheduling module 110 may use other algorithms as well.

Interface module 112 manages communications between grid administrator 106 and the other components of system 100. For example, interface module 112 may be configured to periodically poll nodes 102 on a regular basis to request their current status and power usage. Interface module 112 may be implemented based on hardware and software and utilize protocols, such as TCP/IP, hypertext transport protocol, etc. In addition, interface module 112 may be configured to receive workload requests and results from nodes 102. Interface module 112 may also provide results to the workload requester after they have been packaged by management module 112.

A human administrator (not shown) may use interface module 112 to control grid administrator 106. For example, as shown, a terminal 116 may be coupled to interface module 112 and allow a human administrator to control the operations of grid administrator 106. Of course, terminal 116 may be locally or remotely coupled to interface module 112.

Database 114 comprises various equipment and storage to serve as a repository of information that is used by grid administrator 106. For example, database 114 may comprise various tables or information that track the inventory of nodes 102 in grid system 100, such as their various characteristics like processor architectures, memory, network interface cards, and the like. In addition, database 114 may include information or tables that archive various histories of grid system 100. These histories may include power consumption histories, cost histories, workload histories, trend information, and the like.

The information in database 114 may be automatically collected by grid administrator 106 or may be periodically entered, such as by a human administrator or operator. For example, nodes 102 may each contain one or more software agents (not shown) that collect status information, such as processor utilization, memory utilization, I/O utilization, and power consumption. These agents may then provide this information to grid administrator 106 and database 114 automatically or upon request. Database 114 may comprise a history of electricity costs. These costs may vary according to the time of day, time of year, day of the week, location, etc. In addition, database 114 may also include information that indicates cooling costs. Cooling costs may be the electricity costs associated with powering cooling equipment, such as fans and air conditioners. Furthermore, database 114 may comprise a history of information that indicates personnel or labor costs associated with various configurations of nodes 102. Again, these costs may vary according to the time of day, time of year, day of the week, location, etc. Other types of costs (economic or non-economic) may be stored in database 114. For example, database 114 may comprise information that indicates service level agreements, administrative capacity, etc., for nodes 102.

Management module 108 may monitor the workload of grid system 100 using load monitoring technology. Management module 108 may maintain status information in database 114 as it is monitoring the workload. For example, module 108 can maintain information for each of nodes 102 that indicates the status of processor utilization, memory utilization, and I/O utilization. This information may later be utilized by management module 108 to determine which configurations of nodes 102 will satisfy the requested workloads. When determining the workload requested from nodes 102, management module 108 may consider the current workload as well as anticipated workload. For example, as noted above, management module 108 may determine the current status of workloads requested from nodes 102. In addition, management module 108 may query database 114 to determine the history of workloads. Based on this history, management module 108 may then determine the expected change (if any) for the workload. Management module 108 may base this determination on various windows, such as minutes, hours, days, etc. Once management module 108 has determined the workflow (current and/or expected) requested from nodes 102, grid administrator 106 determines various proposed configurations that can satisfy the workload (current and/or expected). In particular, grid administrator 106 may evaluate the capabilities of each of nodes 102 and determine a set of nodes 102 that can satisfy the workload. For example, the requested workload may be parsed in terms of processor workload, memory workload, and I/O workload. Management module 108 may then determine if some or all of the workload can be concentrated onto various numbers of nodes 102. For example, management module 108 may query database 114 to determine the current status and capacities of each of nodes 102. Based on these individual capacities, management module 108 may generate various combinations or sets of nodes 102 that can satisfy the workload. Management module 108 may begin by determining a minimum number of nodes 102 that can satisfy the workload and progressively determine combinations having an increasing number of nodes 102. Of course, management module 108 may also consider other factors, such as the proximity of nodes 102 to where the requested workflow originated, service level agreements associated with any of nodes 102, network bandwidth available to each of nodes 102. The cost of each alternative configuration can be considered. For example, in some embodiments, management module 108 may determine electricity costs, cooling costs, and personnel costs for each configuration. Management module 108 may select a configuration based on an individual cost, such as electricity costs, or based on a combination or aggregate of multiple costs, such as electricity costs, cooling costs, and personnel costs. The computer nodes 102 may selectively deactivate or activate based on the commands from grid administrator 106. Other management tasks, such as an acknowledgement message or a message that reports status information, may also be part of the response of nodes 102.

To provide high performance, a clustered, load balanced server system is used. For web use, load balancers are connected to the internet and TCP/IP switches are used to direct web requests to different server slices. The servers are connected to storage area network (SAN) switches which are connected to RAID aggregators. The RAID aggregators in turn communicate with rear SAN switches which interface with a plurality of SANs.

Other embodiments of the disclosure will be apparent from consideration of the specification and practice of the disclosure. It is intended that the specification and examples be considered as representative only, with a true scope and spirit of the claimed subject matter being indicated by the following claims.

What is claimed is:

1. A computer comprising:
   an operating system including a kernel and a task scheduler, wherein the task scheduler is configured to schedule execution of one or more processes on the computer, wherein the operating system is coupled to a global power manager, and wherein the global power manager is coupled to one or more computer nodes;
   a power estimator coupled to the task scheduler, and configured to estimate a required power based on quantity or type of processes scheduled for execution; and a variable load power supply including a local power manager configured to receive a request for the estimated required power, wherein the global power manager is configured to move one or more processes from the computer to the one or more computer nodes and to reduce the required power for the computer, and wherein the local power manager is configured to enable the variable load power supply to provide sufficient power to satisfy the request for the estimated required power.

2. The computer of claim 1, wherein the variable load power supply comprises a plurality of power generators, each configured to provide an output of a predetermined power, wherein the local power manager is coupled to the plurality of power generators, and wherein the local power manager is configured to enable a sufficient number of power generators to satisfy the request for the estimated required power.

3. The computer of claim 2, further comprising a low power stand-by generator configured to power the computer during sleep, stand-by, or hibernation, wherein the remaining power generators are disabled during sleep, stand-by, or hibernation.

4. The computer of claim 3, wherein the local power manager is configured to disable unneeded power generators to conserve energy.

5. The computer of claim 3, wherein the local power manager comprises a kernel process scheduler.

6. The computer of claim 3, wherein the local power manager comprises an operating system work load manager.

7. The computer of claim 3, wherein the local power manager is configured to determine which processes are executed next and corresponding power to be delivered from the plurality of power generators.

8. The computer of claim 1, wherein the global power manager is configured to move all tasks from the computer to the one or more computer nodes and to place the computer in a sleep mode or a low power mode.

9. A system comprising:
a plurality of computers forming a computer grid or a computing cloud, each computer comprising:
an operating system including a kernel and a task scheduler configured to schedule execution of one or more processes on the computer;
a power estimator coupled to the task scheduler, wherein the power estimator is configured to estimate a required system power based on number or type of processes scheduled for execution;
a variable load power supply including a plurality of power generators each configured to have a predetermined power output and a local power manager configured to receive instructions from the power estimator, wherein the local power manager is configured to enable a sufficient number of power generators to match the required power estimated by the power estimator; and a global power manager coupled to the plurality of computers, wherein the global power manager is configured to move one or more tasks from a first computer to a second computer and to reduce the predetermined amount of power required by the first computer.

10. A method comprising:
scheduling execution of one or more processes on a computer by an operating system kernel;
estimating a required power by the operating system kernel based on quantity or type of processes scheduled for execution;
moving one or more processes from the computer to one or more computer nodes and to reduce the required power for the computer; and
enabling a variable load power supply to satisfy a request from the operating system kernel for the estimated required power, wherein the power supply includes a plurality of power generators each having a predetermined power output.

11. The method of claim 10, further comprising disabling unneeded power generators to conserve energy.

12. The method of claim 10, further comprising determining which processes are executed next and delivering the corresponding power from the power generators.

13. The method of claim 10, further comprising placing the computer in a sleep mode or low power mode.

14. A non-transitory computer-readable storage medium having instructions stored thereon that, in response to execution by at least one computing device, cause the at least one computing device to:
schedule execution of one or more processes on a computer;
estimate a required power based on quantity or type of processes scheduled for execution;
move one or more tasks from the computer to one or more other computer nodes to reduce the required power for the computer; and
enable a variable load power supply to satisfy a request for the estimated required power, wherein the variable load power supply includes a plurality of power generators each having a predetermined power output.

15. The non-transitory computer-readable storage medium of claim 14, further causing the at least one computing device to disable unneeded power generators to conserve energy.

16. The non-transitory computer-readable storage medium of claim 14, further causing the at least one computing device to determine which processes are executed next and delivering the corresponding power from the power generators.

17. The non-transitory computer-readable storage medium of claim 14, further causing the at least one computing device to place the computer in a sleep mode or a low power mode.

* * * * *

UNITED STATES PATENT AND TRADEMARK OFFICE
CERTIFICATE OF CORRECTION

PATENT NO. : 8,583,945 B2  
APPLICATION NO. : 12/813734  
DATED : November 12, 2013  
INVENTOR(S) : Tran Page 1 of 1

It is certified that error appears in the above-identified patent and that said Letters Patent is hereby corrected as shown below:

In the Specification

In Column 4, Line 6, delete "voltage and" and insert -- voltage regulators and --, therefor.

In the Claims

In Column 13, Line 31, in Claim 7, delete "and corresponding" and insert -- and the corresponding --, therefor.

Signed and Sealed this  
Twenty-ninth Day of April, 2014

Michelle K. Lee  
*Deputy Director of the United States Patent and Trademark Office*